A. L. DE LEEUW.
SPINDLE LOCKING MECHANISM FOR MACHINE TOOLS.
APPLICATION FILED OCT. 4, 1909.
964,764.
Patented July 19, 1910.
2 SHEETS—SHEET 1.
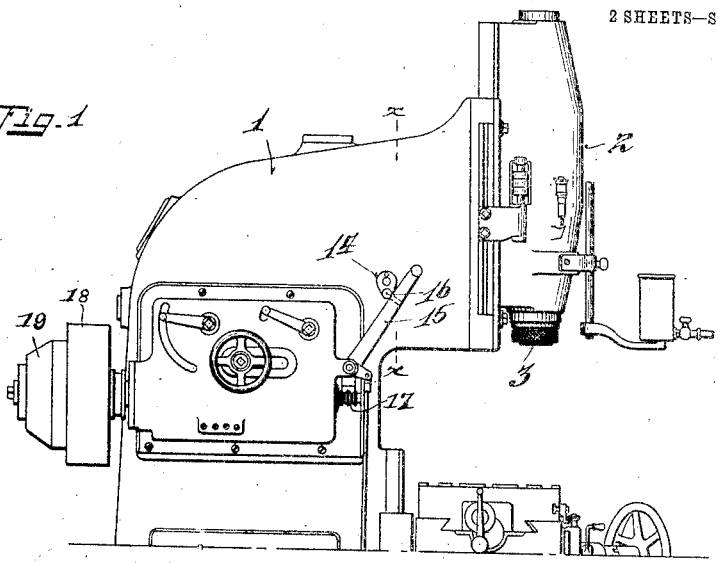
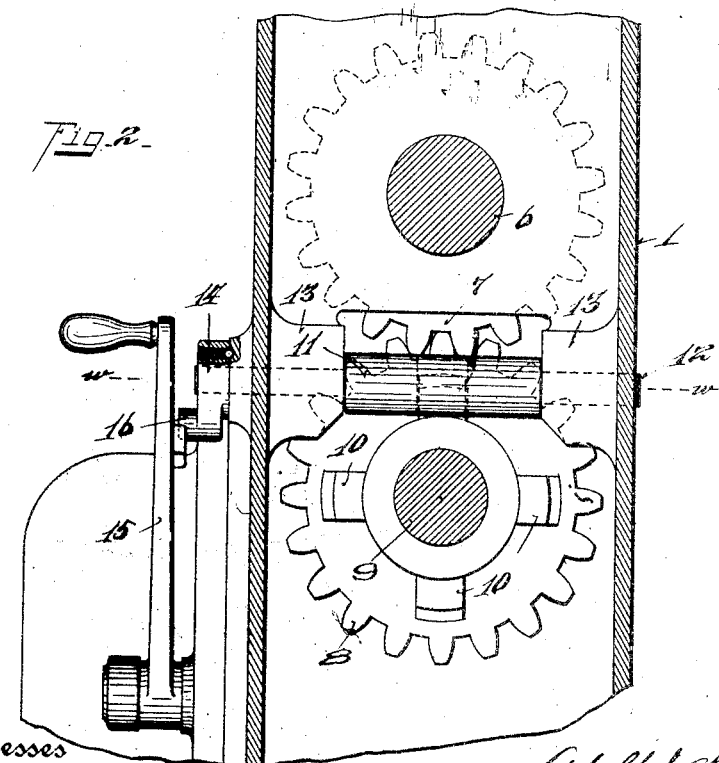

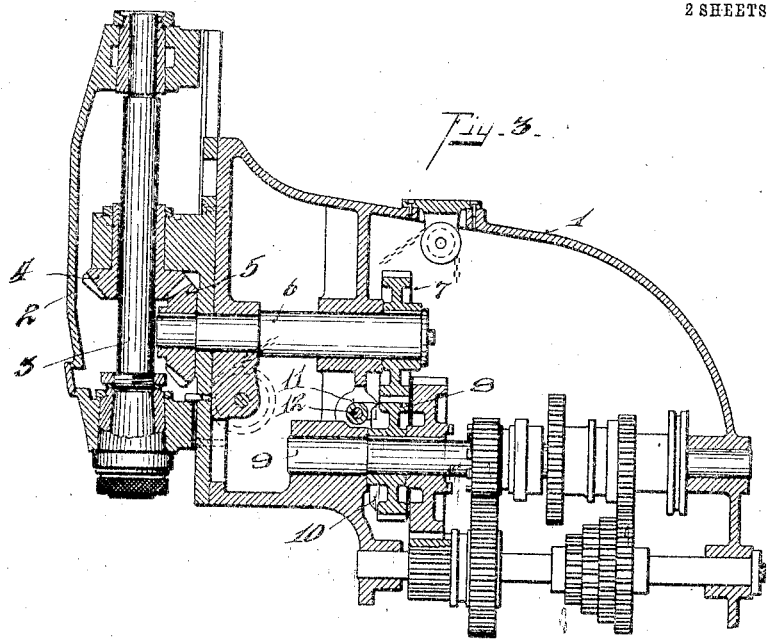
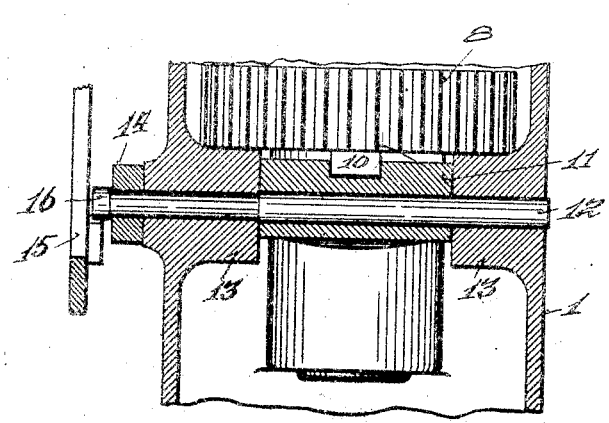

UNITED STATES PATENT OFFICE.

ADOLPH L. DE LEEUW, OF HAMILTON, OHIO, ASSIGNOR TO THE CINCINNATI MILLING MACHINE COMPANY, OF CINCINNATI, OHIO, A CORPORATION OF OHIO.

SPINDLE-LOCKING MECHANISM FOR MACHINE-TOOLS.

964,764.

Specification of Letters Patent. Patented July 19, 1910.

Application filed October 4, 1909. Serial No. 520,816.

*To all whom it may concern:*

Be it known that I, ADOLPH L. DE LEEUW, a citizen of the United States, residing at Hamilton, in the county of Butler and State of Ohio, have invented certain new and useful Improvements in Spindle-Locking Mechanism for Machine-Tools, of which the following is a specification.

My invention relates to an improvement in means for locking the spindle of a machine tool against rotation for applying or withdrawing various working tools, relieving the driving mechanism of undue strains from such source.

The object of my invention is to provide the spindle of a machine tool, or one of the power transmitting elements thereof, with means adapted to engage therewith for locking the same against rotation when the power transmission mechanism is at rest, together with means for disengaging the locking means through mechanism controlling said power transmitting mechanism when throwing the power into commission.

The features of the invention are more fully set forth in the description of the accompanying drawings, forming a part of this specification, in which:—

Figure 1 is a side elevation of a vertical milling machine to which my improvement is applied. Fig. 2 is an enlarged section on line $x$, $x$, Fig. 1. Fig. 3 is an enlarged central vertical section through the spindle and head of a milling machine, as illustrated in Fig. 1. Fig. 4 is a section on line $w$, $w$, Fig. 2.

While I have illustrated a vertical type of milling machine, as the machine tool to which my improvement is applied, it is obvious that the same can be applied to the horizontal type or any other class of machine tools having a revolving spindle for carrying the work holding or cutting tools.

1 represents the frame of the machine.

2 represents the vertical movable head.

3 represents the spindle journaled therein.

4 represents a beveled gear having a splined connection with the spindle, for revolving the same, in mesh with a gear 5, fixed on shaft 6, said shaft being suitably journaled in bearings formed in the frame 1.

7 represents a gear fixed on shaft 6, in mesh with a gear 8, fixed upon a shaft 9, forming an element of a variable speed system, for conveying various speeds to the spindle, to the gearing just described. The gear 8 upon one side is provided with a series of lugs 10, adapted to be engaged by an oscillating locking member 11, mounted upon a rock shaft 12, said rock shaft being suitably journaled in bearings formed in the main frame 1. The locking member is preferably elongated in form, adapted to engage the edge face of the bearings 13, carrying the rock shaft 12, so as to prevent lateral movement of the locking member, when engaged with the lugs of the gear 8, and this engagement is preferably formed by providing the lock plate 11, with a notch between which one of the lugs 10 engages.

14 represents a lever fixed to the rock shaft 12, for manipulating the locking member.

15 represents a lever for controlling clutch mechanism to throw on and off the power to the spindle. As illustrated, the lever 15 is in engagement with a clutch actuating rod 17, horizontally projected through a hollow main driving shaft, upon which the pulley 18 loosely journals. The rod 16 is in connection with clutch shifting mechanism, not shown, for moving the clutch member 19 into frictional engagement with the pulley 18, said pulley shaft being in driving connection through intermediate gearing, not shown, with shaft 9. It is obvious, however, that the lever 15 may control clutch mechanism of any design for controlling the transmission of power to shaft 9. This lever is so arranged, that in its path of movement to throw in the driving mechanism, it will engage a projecting boss 16, of the lever 14, to disengage the locking member from the gear, prior to completing the movement of the lever 15, throwing in the power, to insure that the gear 8 is free from its engagement with the locking mechanism, and further, prevents a locking of this gear as long as the power remains thrown in, it being necessary to swing the lever 15, to its power disengaging position, before it is possible to swing lever 14 manually to engage the locking member with one of the lugs 10.

It is also obvious that the locking mechanism could be directly applied to the spindle, instead of one of the transmitting gears therefor when the spindle occupies a fixed position, as is the case in a horizontal milling machine, without departing from the features of my invention.

It is very desirable in machines of this class to lock the spindle against rotation at a point between the spindle and transmission elements therefor, where working tools, face plates, chucks, etc., are directly applied upon the spindle, to relieve the transmitting elements of spindle strains, thus saving the breakage of teeth of the transmission gearing, and affording great pressure to be applied to the tool when inserting or removing the same from the spindle.

Having described my invention, I claim:

1. In a machine of the class described, a rotary spindle, rotary driving mechanism having a wheel formed with a member to be locked, a rock-shaft, a locking member thereon, adapted to be moved into and out of the path of the member to be locked to interlock therewith, and a handle for manipulating the rock shaft, a clutch controlling the driving mechanism, and a handle for operating the same, said handles being relatively positioned and movable, so that the movement to engage the clutch releases the lock.

2. In a machine of the class described, a frame, a rotary spindle and rotary driving mechanism mounted in bearings in the frame, one of the rotary driving elements being formed with a member to be locked, a rock shaft having bearings in the frame, and arranged transversely relative to the member to be locked, a swinging locking member on said rock shaft occupying a position between the bearings thereof, and adapted to be moved into and out of the path of movement of the member to be locked, so as to interlock therewith, a handle for manipulating the rock shaft, a clutch controlling the driving mechanism, and a handle for operating the same, said handles being relatively positioned and movable, so that the movement to engage the clutch releases the lock.

3. In a machine of the class described, a rotary spindle, and rotary driving mechanism, a clutch for controlling the driving mechanism, a handle for manipulating the clutch, one of the rotary driving elements being formed with a member to be locked, driven through the clutch, a rock shaft arranged transversely relative to the member to be locked, a locking member on the rock shaft adapted to be moved into and out of the path of movement of the member to be locked, so as to interlock therewith, and a handle for locking said shaft, the handle for manipulating the locking member occupying a position when the spindle is locked, in the path of movement of the handle for controlling the clutch, when it is set in position for disengaging the clutch, whereby the movement of the handle to throw in the clutch automatically disengages the lock.

In testimony whereof, I have hereunto set my hand.

ADOLPH L. DE LEEUW.

Witnesses:
OLIVER B. KAISER,
EMMA SPENER.